(12) United States Patent
Garan

(10) Patent No.: US 11,754,849 B2
(45) Date of Patent: Sep. 12, 2023

(54) OPTICAL ASSEMBLY FOR CAPITALIZING UNPOLARIZED LIGHT AND METHOD THEREOF

(71) Applicant: BAE SYSTEMS INFORMATION AND ELECTRONICS INTEGRATION INC., Nashua, NH (US)

(72) Inventor: Jacob D. Garan, Honoulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 648 days.

(21) Appl. No.: 16/702,706

(22) Filed: Dec. 4, 2019

(65) Prior Publication Data

US 2021/0278684 A1    Sep. 9, 2021

(51) Int. Cl.
*G02B 27/28* (2006.01)
*G02B 27/12* (2006.01)
*G02B 27/10* (2006.01)

(52) U.S. Cl.
CPC ....... *G02B 27/283* (2013.01); *G02B 27/1006* (2013.01); *G02B 27/123* (2013.01)

(58) Field of Classification Search
CPC .............. G02B 27/283; G02B 27/1006; G02B 27/123

USPC ...................................................... 359/484.05
See application file for complete search history.

(56) References Cited

U.S. PATENT DOCUMENTS

2002/0140905 A1\* 10/2002 Ouchi .................... G02B 27/14
349/5

\* cited by examiner

*Primary Examiner* — Joseph P Martinez
*Assistant Examiner* — Mitchell T Oestreich
(74) *Attorney, Agent, or Firm* — Sand, Sebolt & Wernow LPA; Gary McFaline

(57) ABSTRACT

An optical assembly includes a plurality of polarizing beamsplitters (PBS) including a first PBS and a second PBS. Each PBS includes a similar splitting optical coating. The splitting optical coating on the second PBS is oriented as rotated 90° relative to the splitting optical coating on the first PBS. There may be a third PBS offset to another side of the first PBS. The splitting optical coating on the third PBS, which is similar to the splitting optical coating on the first PBS and the second PBS, is oriented as rotated 90° relative to the splitting optical coating on the first PBS. The splitting optical coatings on the second PBS and the third PBS may be oriented in the same direction. A beamsplitting assembly may be formed from the optical assembly by coupling image sensors to major surfaces of the second PBS and the third PBS.

9 Claims, 12 Drawing Sheets

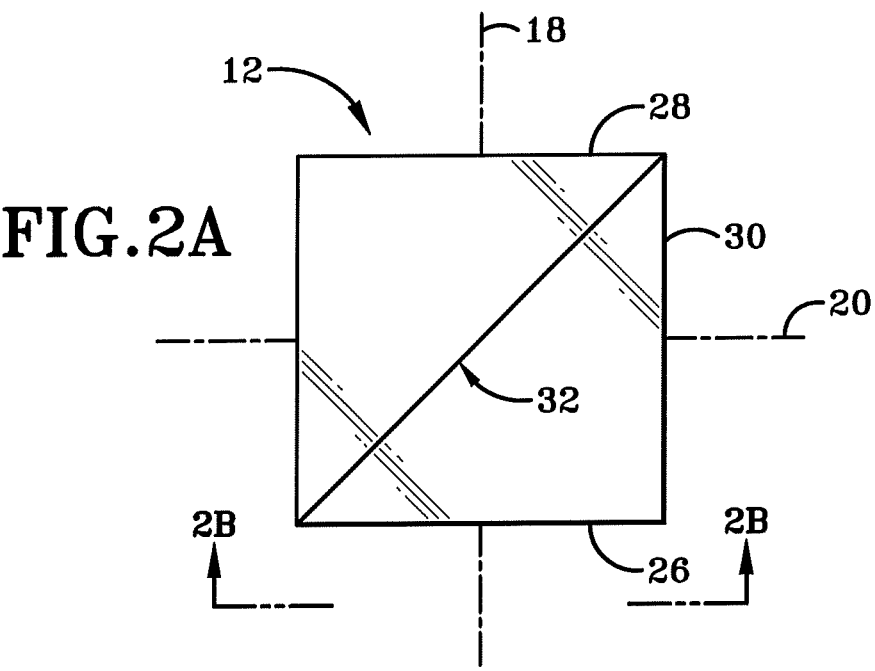
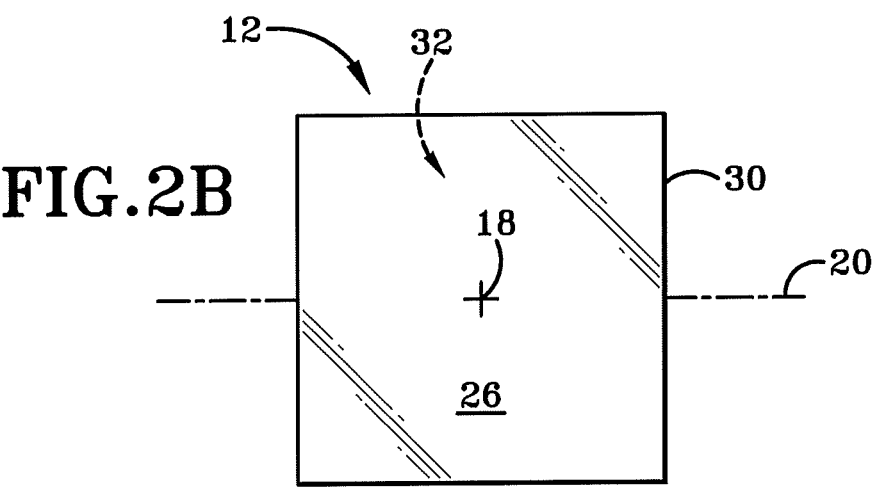

OPTICAL ASSEMBLY FOR CAPITALIZING UNPOLARIZED LIGHT AND METHOD THEREOF

STATEMENT OF GOVERNMENT INTEREST

This invention was made with government support under Contract No. N00014-18-C-2050 awarded by the United States Navy. The government has certain rights in the invention.

TECHNICAL FIELD

The present disclosure relates generally to polarimetric imaging systems. More particularly, the present disclosure relates to a polarimetric beam splitting assembly and image sensor that utilizes specific coatings to polarized beamsplitters to enable the evaluation of unpolarized light of additional wavebands to be sensed via an image sensor.

BACKGROUND

Polarizing beamsplitter cubes or polarizing beam splitters (PBSs) are used to split a laser beam into two orthogonally polarized components; P polarization is transmitted straight through while S polarization is reflected at 90°. PBS cubes can utilize a durable all-dielectric coating at the internal cemented interface, and all external surfaces are antireflection coated for the wavelength specified. Typically, PBS cubes are used with collimated or near-collimated input light. The PBS and other beamsplitter cubes are easy to mount, mechanically durable. Notably, there are other types of PBS splitting devices, such as a wire-grid PBS.

For one exemplary PBS the substrate material may be Schott N-BK7 glass. The extinction ratio may be $T_P/T_S > 1000:1$. The transmission efficiency may be TP>95%. The reflection efficiency may be RS>99.5%. The antireflection coating may be R≤0.25% per surface. The transmitter wavefront distortion may be $n\lambda/4$ for 1.00" PBS cubes, where N is the number of PBS cubes.

Other exemplary PBSs may have different specifications depending on the application specific needs. For example, another PBS may be needed to operate at a different waveband, such as 1064 nm or 355 nm. However, when other exemplary PBSs are needed with different specifications, this requires the supplier/manufacturer to manufacture the other PBS in a different production run.

Currently, one approach to build an imaging system with multiple spectral bands, a multiplicity of different dichroic cubes would be needed to enable the imaging system to detect different wavebands, for example at 355 nm, 532 nm, and 1064 nm.

SUMMARY

Issues continue to exist with polarized image sensors. Namely, there is a need for the ability to add additional spectral bands to existing optical systems without degrading the polarimetry performance of the central band. Adding additional wavebands may prove useful to assist with increasing sensitivity to detections. Typically, polarized imaging systems are used with an optical receiver that discriminate signal purely by the polarization state of the single waveband. Use of additional optical bands can be useful in discriminating the signal. Namely, the signal may discriminate clutter and other optical noise from a signal of interest.

The requirement of using three different dichroic cubes in an imaging system increases production time and costs as each of the different dichroic cubes must be manufactured in a different production run. The alternate approach of using a patterned filter array such as a Bayer filter reduces spatial resolution and is difficult and expensive to change spectral bands. A third approach of using multiple optical receivers/lenses, each with their own spectral bandpass filters, increases cost due to the need for multiple lenses or optical receivers. Thus, a need continues to exist for an improved imaging system or optical assembly that decreases costs but still utilizes the advantages of a PBS. The present disclosure addresses this need by providing an optical assembly that may be part of an imaging system that utilizes a plurality of identical PBS cubes but is still able to image different wavebands of the input light. By using identical cubes, the optical assembly of the present disclosure is able to reduce costs by obtaining multiple cubes from a single production run (as opposed to multiple production runs), which results in cost savings that may passed along the commerce stream.

In one aspect, an exemplary embodiment of the present disclosure may provide a method comprising: inputting broadband light into a first polarizing beamsplitter (PBS) including a first splitting optical coating, wherein the broadband light includes wavebands in a short-wavelength waveband, a central wavelength waveband, and an long-wavelength waveband, each relative to the central waveband over which the splitting optical coating split the polarization across; reflecting wavebands in the shorter-wavelength waveband at the first optical coating; polarizing and splitting wavebands in the central wavelength waveband at the first optical coating; passing wavebands in the long-wavelength waveband through the first splitting optical coating; transmitting wavebands in the long-wavelength waveband and P-polarized wavebands in the central waveband to a second PBS having a second optical coating that is identical to the first optical coating, and the second optical coating is oriented as rotated 90° relative the first optical coating; passing wavebands in the long-wavelength waveband through the second optical coating; reflecting residual polarized light/wavebands in the central wavelength waveband at the second optical coating; passing wavebands in the long-wavelength waveband with an image sensor coupled to the second PBS and tuned to the long-wavelength waveband; and passing P-polarized wavebands in the central waveband with another image coupled to the second PBS and tuned to the central waveband. This exemplary embodiment or another exemplary embodiment may further provide isolating wavebands in the short-wavelength waveband and reflected S-polarized light wavebands in the central waveband from the first PBS to a third PBS having a third optical coating that is identical to the first optical coating and the second optical coating, and the third optical coating is oriented as rotated 90° relative to the first optical coating such that the S-polarized output from the first PBS passes through the third PBS coating; passing wavebands in the central wavelength waveband through the third optical coating; reflecting unpolarized wavebands in the short-wavelength waveband at the third optical coating; imaging or recording the signal of the waveband in the central wavelength waveband with another image sensor image sensor or detector coupled to the third PBS and tuned to the central wavelength waveband (notably, the detector does not need to have multiple pixels or have spatial resolution for this approach to work); and imaging waveband in the short-wavelength waveband with another image sensor image sensors or detector coupled to the third PBS with ample sensitivity to the short-wavelength waveband. The image sensor or detector material or design may be optimized to efficiently capture the signal from each band. For example, the optical detector material may be silicon for the visible range wavebands and InGaAs for shortwave infrared light. Such a trade is made possible by spatially separating the wavebands to different output faces of the PBS assembly. However, there are other useful trades that can be made, by using multiple image sensors. For example, the system could use a high sensitivity camera for the central wavelength where the information is most valuable, and use less sensitive (i.e., less expensive) image sensors on the other outputs in order to save money/complexity.

In another aspect, an exemplary embodiment of the present disclosure may provide an optical assembly comprising: a first polarizing beamsplitter (PBS) having a first splitting optical coating: a second PBS having a second splitting optical coating that is similar to the first splitting optical coating; wherein the second splitting optical coating is oriented as rotated 90° relative to the first splitting optical coating; and wherein the first PBS and the second PBS are similar in construction such that the first splitting optical coating is the same as the second splitting optical coating and are adapted to be produced during a single manufacturing run to ensure the splitting optical coatings are identical. This exemplary embodiment or another exemplary embodiment may further provide a third PBS having a third splitting optical coating that is similar to the first splitting optical coating and the second splitting optical coating; wherein the third splitting optical coating is oriented as rotated 90° relative to the first splitting optical coating; and wherein the first PBS, the second PBS, and the third are similar in construction such that the first splitting optical coating is the same as the second splitting optical coating and is the same as the third splitting optical coating and are adapted to be produced during a single manufacturing run to ensure the splitting optical coatings are identical. This exemplary embodiment or another exemplary embodiment may further provide four image sensor image sensors or detectors including a first image sensor coupled the second PBS to image polarized wavebands in a central wavelength waveband range, a second image sensor coupled to the second PBS to image unpolarized wavebands in an long-wavelength waveband, a third image sensor coupled to the third PBS to image the polarized wavebands in the central wavelength waveband, and a fourth image sensor coupled the third PBS to image the wavebands in a short-wavelength waveband; and imaging logic coupled to each of the four image sensors that output results of the detected light in each of the three wavebands.

In another aspect, an exemplary embodiment of the present disclosure may provide a beamsplitting assembly comprising: a first polarizing beam splitter (PBS) having an optical axis extending from a first surface to a second surface wherein the second surface is parallel to the first surface, and the first PBS includes a third surface orthogonal to the first surface and the second surface of the first PBS, wherein a transverse axis extends through the third surface and the transverse axis is orthogonal to the optical axis; an splitting optical coating on the first PBS extending diagonally from first surface to the second surface that splits and polarizes light into one of three waveband, wherein the three wavebands include an unpolarized short-wavelength waveband, a polarized central-wavelength waveband, and an unpolarized long-wavelength waveband, wherein light input into the first PBS that is in the short-wavelength waveband is reflected by the splitting optical coating out the third surface, and light input into the first PBS that is in the central wavelength waveband is polarized and split such that S-polarized wavebands relative to the first PBS are reflected towards the third surface and P-polarized wavebands pass through the splitting optical coating to towards the second surface along the optical axis, and light input into the first PBS that is in the long-wavelength waveband passes through the splitting optical coating towards the second surface; a second PBS aligned along the optical axis from a fourth surface to a fifth surface, wherein the fifth surface is parallel to the fourth surface, and the fourth surface is parallel and directly interfaced with the second surface of the first PBS, and the second PBS includes a sixth surface orthogonal to the fourth surface and the fifth surface of the second PBS, wherein a first vertical axis extends through the sixth surface and the vertical axis is orthogonal to the optical axis and the transverse axis in the first PBS; an splitting optical coating on the second PBS extending diagonally from fourth surface to the fifth surface that splits and polarizes light wherein the linearly polarized light output from the first PBS and input into the second, cross-polarized PBS that is in the central waveband is polarized and reflected such that P-polarized wavebands output from the first beamsplitter reflects as s-polarized light relative to the second PBS towards the sixth surface, and light output from the first PBS and input into the second PBS that is in the long-wavelength waveband passes through the splitting optical coating of the second PBS towards the fifth surface and remains unpolarized; wherein the second PBS is oriented relative to the first PBS as rotated 90° about the optical axis; and a third PBS aligned along the transverse axis of the first PBS from a seventh surface to an eighth surface, wherein the eighth surface is parallel to the seventh surface, and the seventh surface is parallel and directly interfaced with the third surface of the first PBS, and the third PBS includes a ninth surface orthogonal to the seventh surface and the eighth surface of the third PBS, wherein a second vertical axis extends through the ninth surface and the second vertical axis parallel to the first vertical axis, orthogonal to the optical axis, and orthogonal the transverse axis in the first PBS; an splitting optical coating on the third PBS extending diagonally from seventh surface to the eighth surface that splits and polarizes light, wherein the S-polarized wavebands output from the first PBS and light in the short-waveband reflected from the first PBS through the third surface is input into the third PBS through the seventh surface and the splitting optical coating on the third PBS reflects light in the short-waveband along the second vertical axis through the ninth surface, and the S-polarized wavebands reflected output from the first PBS passes through the third splitting optical coating along the transverse axis is polarized into P-polarized wavebands and pass through the eighth surface along the transverse axis due to the rotated orientation; wherein the first PBS, the second PBS, and the third PBS are similar in construction such that the splitting optical coating on the first PBS diagonal surface is the same as the splitting optical coating on the second PBS diagonal surface and is the same as the splitting optical coating on the third PBS diagonal surface, wherein the splitting optical coating on the first PBS, the splitting optical coating on the second PBS, and the splitting optical coating on the third PBS were produced during one manufacturing run that is adapted to ensure the splitting optical coatings are similar; four image sensors including one image sensor coupled to the sixth surface of the second PBS to image the polarized wavebands in the central waveband, one image sensor coupled to the fifth surface of the second PBS to image unpolarized wavebands in the long-wavelength waveband, one image sensor coupled to the eighth surface of the third PBS to image the polarized wavebands in the central waveband, and one image sensor coupled to the ninth surface of the third PBS to image the wavebands in the short-waveband; wherein the image sensor coupled to the fifth surface of the second PBS is an infrared (IR) image sensor; and imaging logic coupled to each of the four image sensors that output results of the detected light in each of the three wavebands.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2A is a top view of a first polarizing beamsplitter.

FIG. 2B is a front elevation view of the first polarizing beamsplitter taken along line 2B-2B in FIG. 2A.

Similar numbers refer to similar parts throughout the drawings.

DETAILED DESCRIPTION

An optical assembly in accordance with an exemplary aspect of the present disclosure is shown throughout the figures generally at 10. Optical assembly 10 includes a first polarizing beamsplitter 12 (PBS), a second PBS 14, and a third PBS 16.

Figure 1:
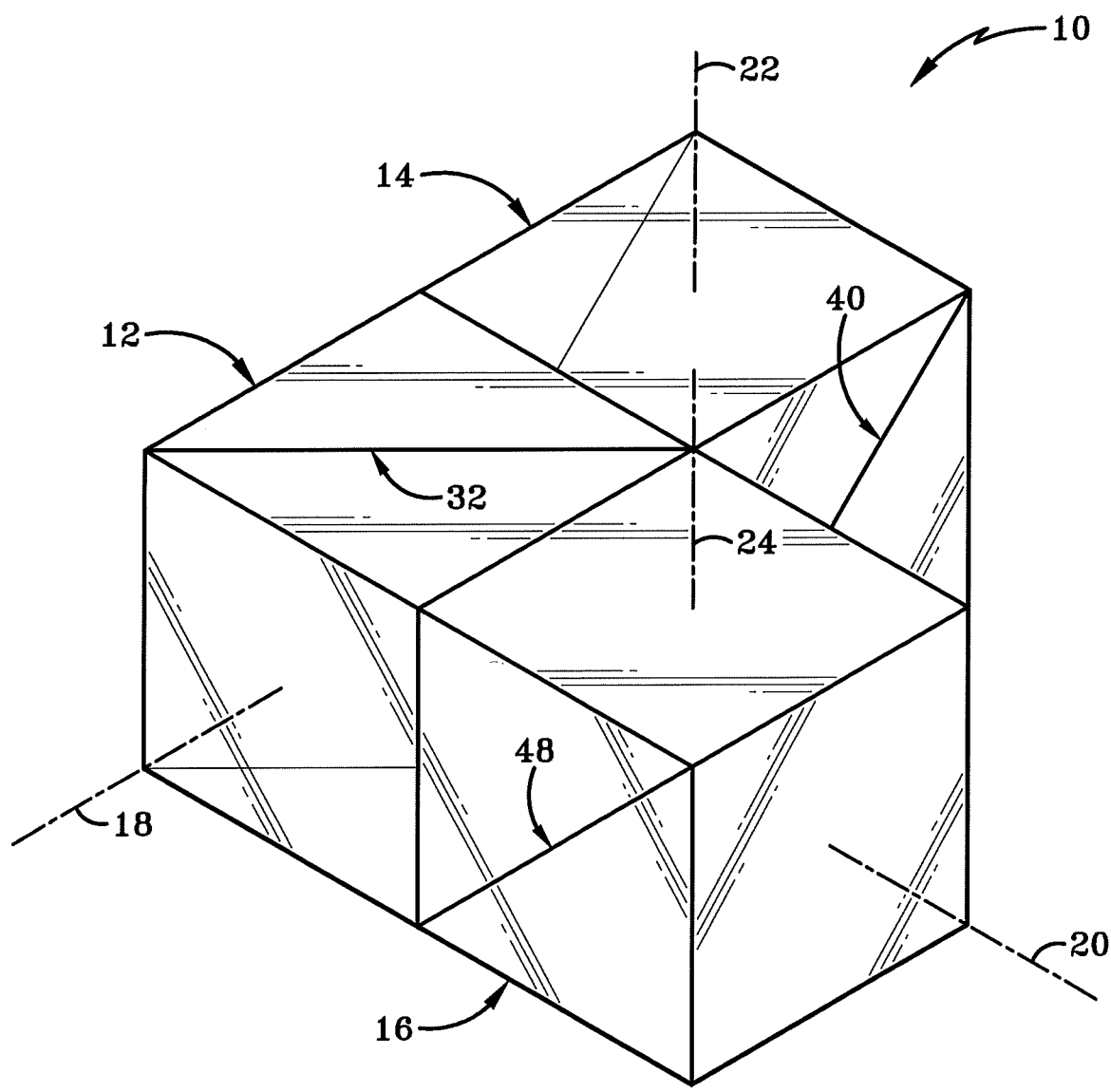
FIG. 1 is a perspective view of an optical assembly in accordance with one aspect of the present disclosure.

FIG. 1 depicts the first PBS 12 coupled with the second PBS 14 along an optical axis 18. The first PBS 12 is coupled to the third PBS 16 along a transverse axis 20. The transverse axis 20 is perpendicular to the optical axis 18. The second PBS 14 includes a first vertical axis 22 that is perpendicular to the optical axis 18 and orthogonal to the transverse axis 20. The third PBS 16 includes a second vertical axis 24 that is perpendicular to the transverse axis 20 and orthogonal to the optical axis 18. The second PBS is oriented approximately 90° from the third PBS relative to the first PBS 12. As will be described in greater detail herein, each of the first PBS 12, second PBS 14, and third PBS 16 are may be optical cubes having external six faces, such that a face on the first PBS 12 is interfaced with a face on the second PBS 14. Additionally, a face on the first PBS 12 is interfaced with a face on the third PBS 16. In one particular embodiment, the faces on the PBSs that interface with adjacent faces on proximate PBSs are considered to be major surfaces of each respective cube. However, while this embodiment depicts a cube geometry, this method would also work with different aspect ratio beamsplitters, such as rectangular prisms. This method would also work with plate polarizing beamsplitters, where the splitter surfaces would be in same locations as the splitting surfaces Additionally, each of the PBSs 12, 14 and 16 include a beamsplitting surface extending diagonally between faces of each respective PBS. The orientation of the splitting surface for each PBS is described in greater detail herein and enables the optical assembly 10 to utilize and image light input along the optical axis 18 to be imaged in a short-wavelength waveband, a S-pol (i.e., cross-polarized) central waveband, a P-pol (i.e., co-polarized) central waveband, and a long-wavelength waveband. In some embodiments, the beamsplitting surface (i.e., splitting optical coatings) are oriented 90° rotated relative to adjacent beamsplitting surfaces on adjacent PBSs.

FIG. 2A and FIG. 2B depict the first PBS 12. The first PBS 12 includes a first surface 26, a second surface 28, and a third surface 30. Each of the surfaces 26, 28 and 30 define respective faces of the first PBS 12, which is generally in the form of a cube. The first surface 26 is offset parallel to the second surface 28. The third surface 30 extends between the first surface 26 and the second surface 30 and is perpendicular thereto. Inasmuch as the first PBS 12 may be a cube, there may be three additional surfaces defining the remainder thereof. In the cube example, the six sides are about the same size. First PBS 12 additionally includes a splitting optical coating or splitting surface 32 that extends diagonally between the first surface 26 and the second surface 28. In one particular embodiment, the angle at which the splitting surface 32 extends between the first surface 26 and the second surface 28 is approximately 45°. Splitting surface 32 is oriented, as will be described in greater detail herein, to split and direct light outwardly through the third surface 30.

Figure 3A:
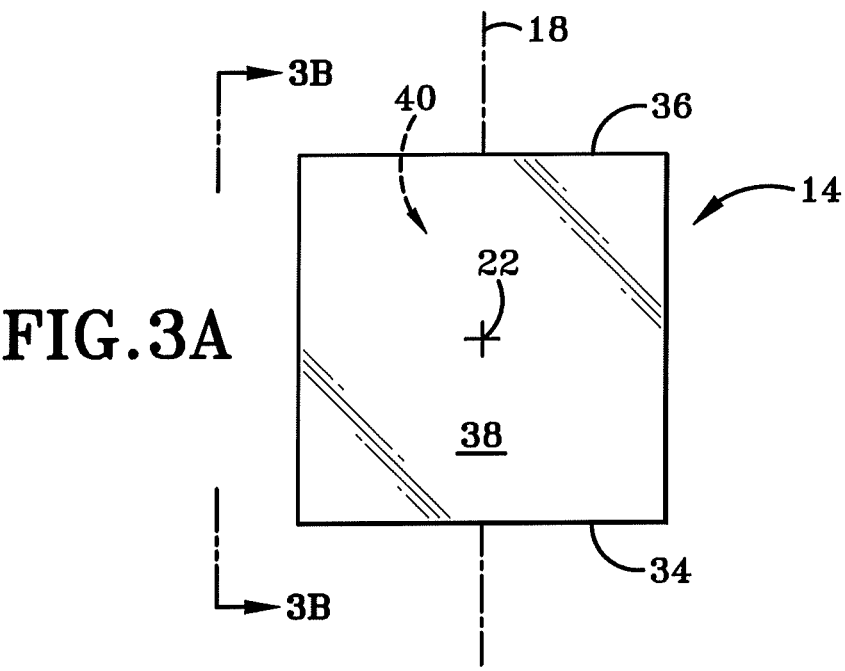
FIG. 3A is a top view of a second polarizing beamsplitter.
Figure 3B:
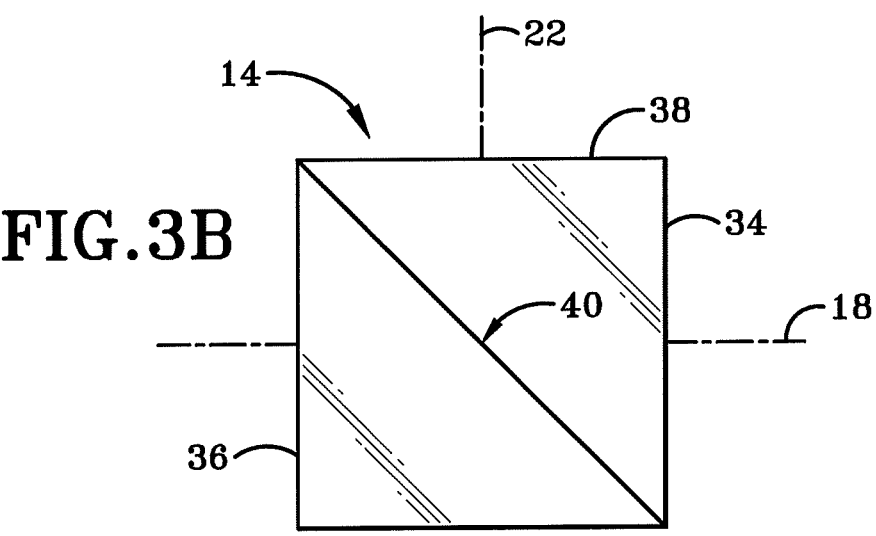
FIG. 3B is a side elevation view of the second polarizing beamsplitter taken along line 3B-3B in FIG. 3A.

FIG. 3A and FIG. 3B depict the second PBS 14 that includes a fourth surface 34, a fifth surface 36, and a sixth surface 38. The fourth surface 34 is offset parallel to the fifth surface 36. The sixth surface 38 extends between the fourth surface 34 and the fifth surface 36 and is perpendicular thereto. The sixth surface 38 may define an upper surface or upper face of the second PBS that intersects the first vertical axis 22. Inasmuch as the second PBS 14 is a cube, there may be three additional surfaces or faces that define the other portions thereof. Second PBS 14 additionally includes a splitting optical coating or splitting surface 40 that extends diagonally between the fourth surface 34 and the fifth surface 36. Splitting surface 40 is oriented, as will be described in greater detail herein, to direct light extending along the optical axis 18 to move outwardly through the sixth surface 38 along vertical axis 22. The splitting surface 40 is oriented at approximately a 45° angle relative to the fourth surface 34 and fifth surface 36.

Figure 4A:
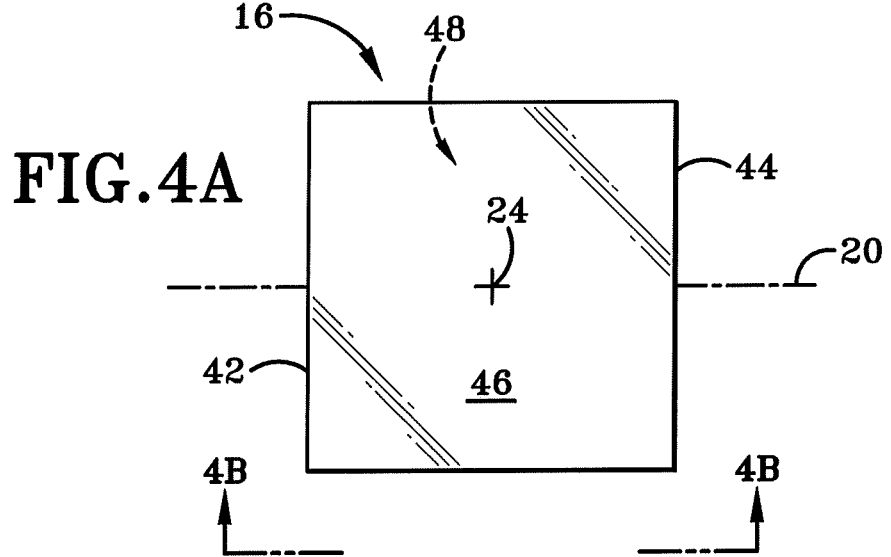
FIG. 4A is a top view of a third polarizing beamsplitter.
Figure 4B:
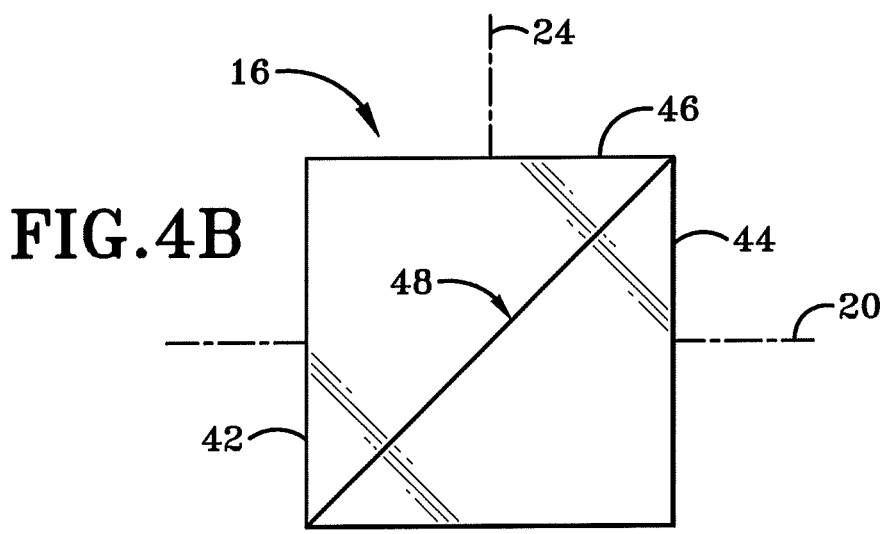
FIG. 4B is a front elevation view taken along line 4B-4B in FIG. 4A.

FIG. 4A and FIG. 4B depict the third PBS 16 that includes a seventh surface 42, an eighth surface 44, and a ninth surface 46. The seventh surface 42 is offset parallel to the eighth surface 44. The ninth surface 46 extends between the seventh surface 42 and the eighth surface 44 and is generally perpendicular thereto. The ninth surface 46 intersects the vertical axis 24. Third PBS 16 additionally includes a splitting optical coating or splitting surface 48 that extends diagonally between the seventh surface 42 and the eighth surface 44. The splitting surface is angled at an approximate 45° angle relative to the seventh surface 42 and the eighth surface 44 and is configured to direct light extending along the transverse axis 20 to be directed out of the ninth surface 46 along the second vertical axis 24.

Figure 5:
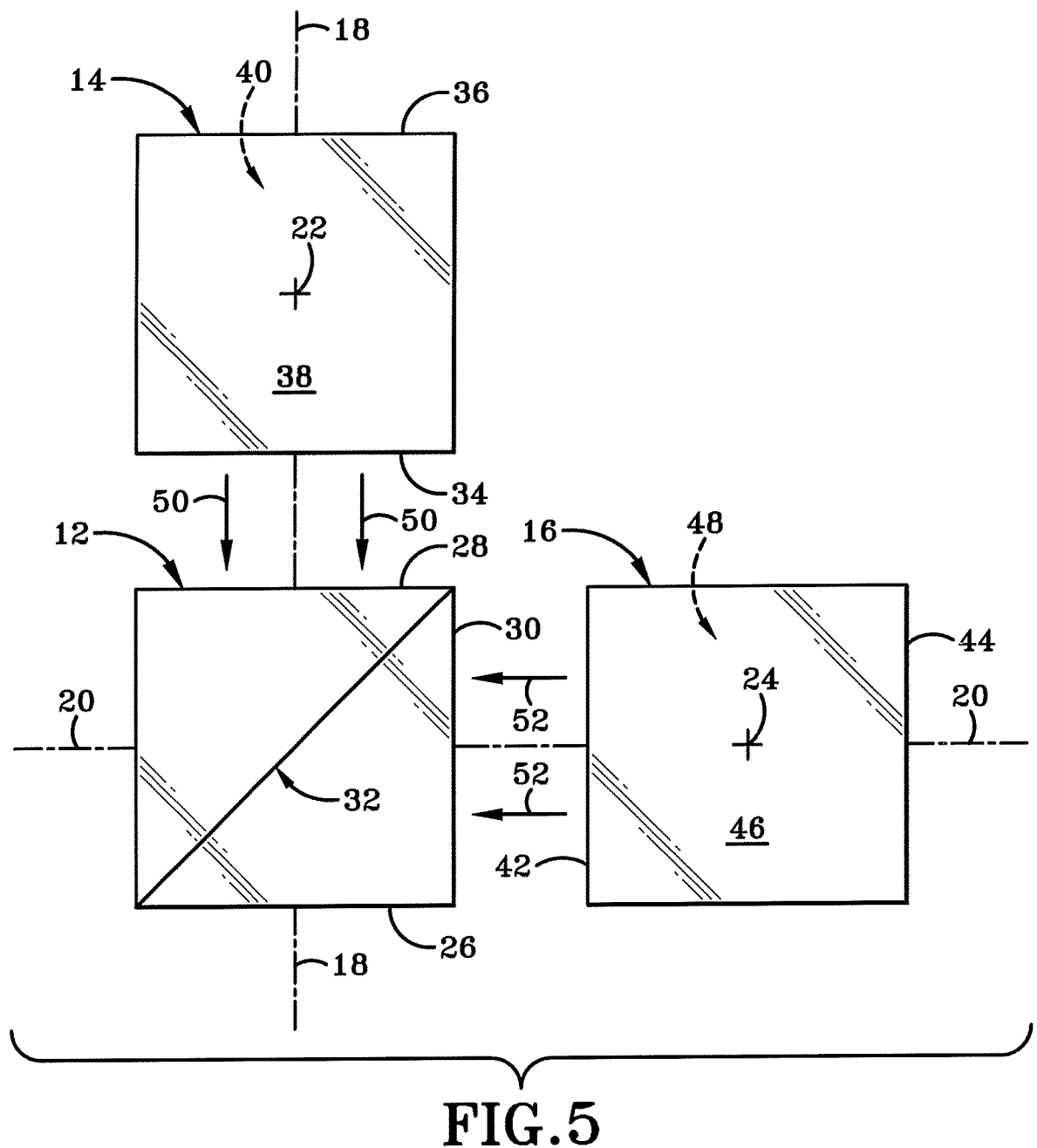
FIG. 5 is an exploded top view of the first, second, and third polarizing beamsplitters.

FIG. 5 depicts the orientation of three PBSs relative to each other. As such, FIG. 5 is a partially exploded view of the first PBS 12 relative to the second PBS 14 and the third PBS 16. The second PBS 14 is aligned with the first PBS 12 along the optical axis 18 such that the second surface 28 faces the fourth surface 34 on the second PBS 14. In one embodiment the optical assembly 10 is configured with a space or gap between the second surface 28 on the first PBS 12 and the fourth surface 34 on the second PBS 14, wherein the gap can be accommodated by spacers or a layer or material. In one particular embodiment there is a direct abutment and bonding of the fourth surface 34 to the second surface 28. Thus, arrows 50 represent that during assembly of the optical assembly 10, the second PBS 14 will be moved into alignment such that the fourth surface 34 on the second PBS 14 directly abuts and is bonded to the second surface 28 on the first PBS 12. The orientation of the second PBS 14 is rotated 90° about the optical axis such that the sixth surface 38 faces upwardly and intersects the first vertical axis 22. As such, the splitting surface 40 in the second PBS 14 is rotated 90° about the optical axis 18 to create a 90° offset relative to the splitting surface 32 in the first PBS 12.

In a particular embodiment, the PBS surfaces are bonded either by optical cement, optical contacting, or chemical bonding, such as hydroxide solution bonding.

The third PBS 16 is orientated and positioned along the transverse axis 20 relative to the first PBS 12. The seventh surface 42 on the third PBS 16 faces the third surface 30 on the first PBS 12. As indicated previously, the optical assembly in one example has a slight gap between the first PBS 12 and the third PBS 16; however, it is envisioned that there is a direct abutment to define an interface between the seventh surface 42 on the third PBS 16 and the third surface 30 on the first PBS 12.

As such, the splitting surface 48 in the third PBS 16 is oriented 90° relative to the splitting surface 32 in the first PBS 12. Arrows 52 (in FIG. 5) represent that during assembly and manufacture of the optical assembly 10, the third PBS 16 is abutted with the third surface 30 on the first PBS 12 to create a bonded interface between the first PBS 12 and the third PBS 16. The ninth surface 46 on the third PBS 16 is orthogonal to the first and second surfaces 26, 28 on the first PBS 12 such that the ninth surface 46 on the third PBS 16 intersects the second vertical axis 24.

Figure 6A:
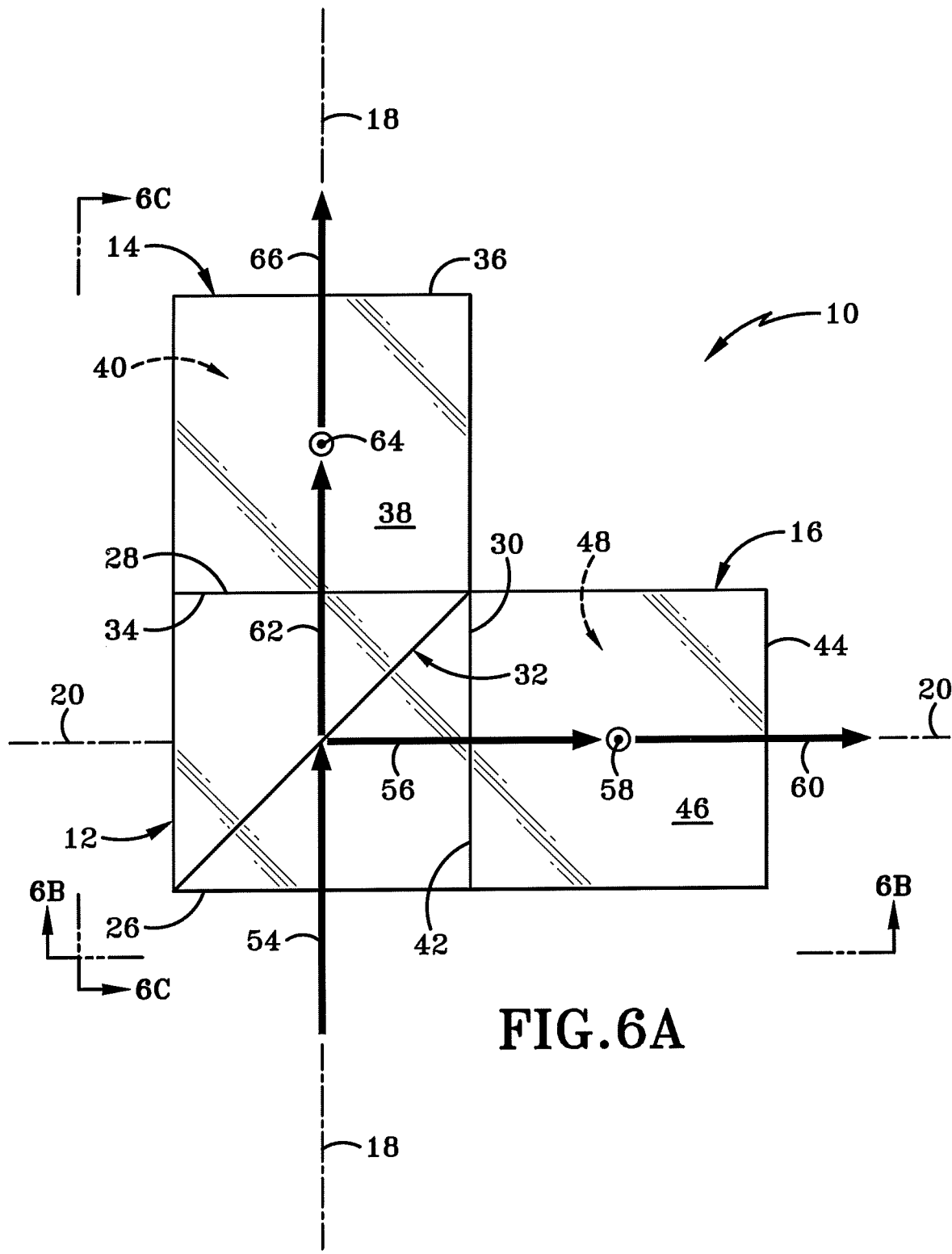
FIG. 6A is an operational top view of the optical assembly formed from the three polarizing beamsplitters.
Figure 6B:
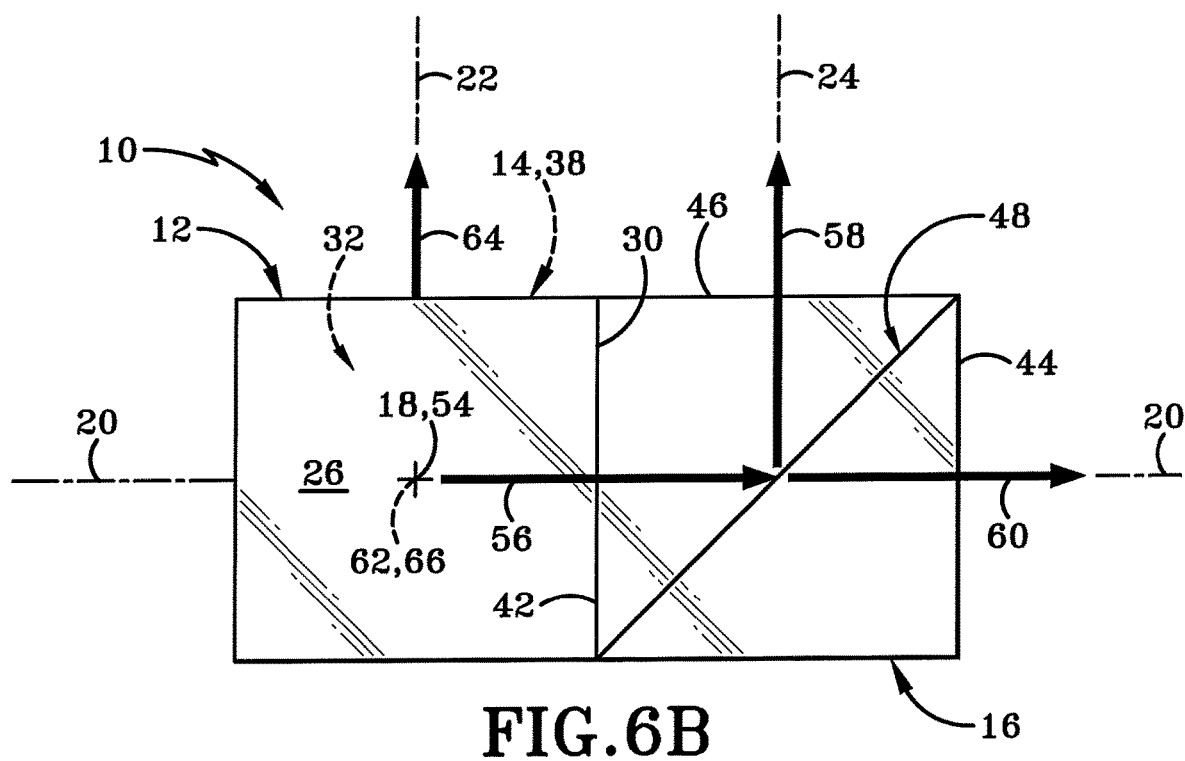
FIG. 6B is an operational front elevation view of the optical assembly taken along line 6B-6B if FIG. 6A.
Figure 6C:
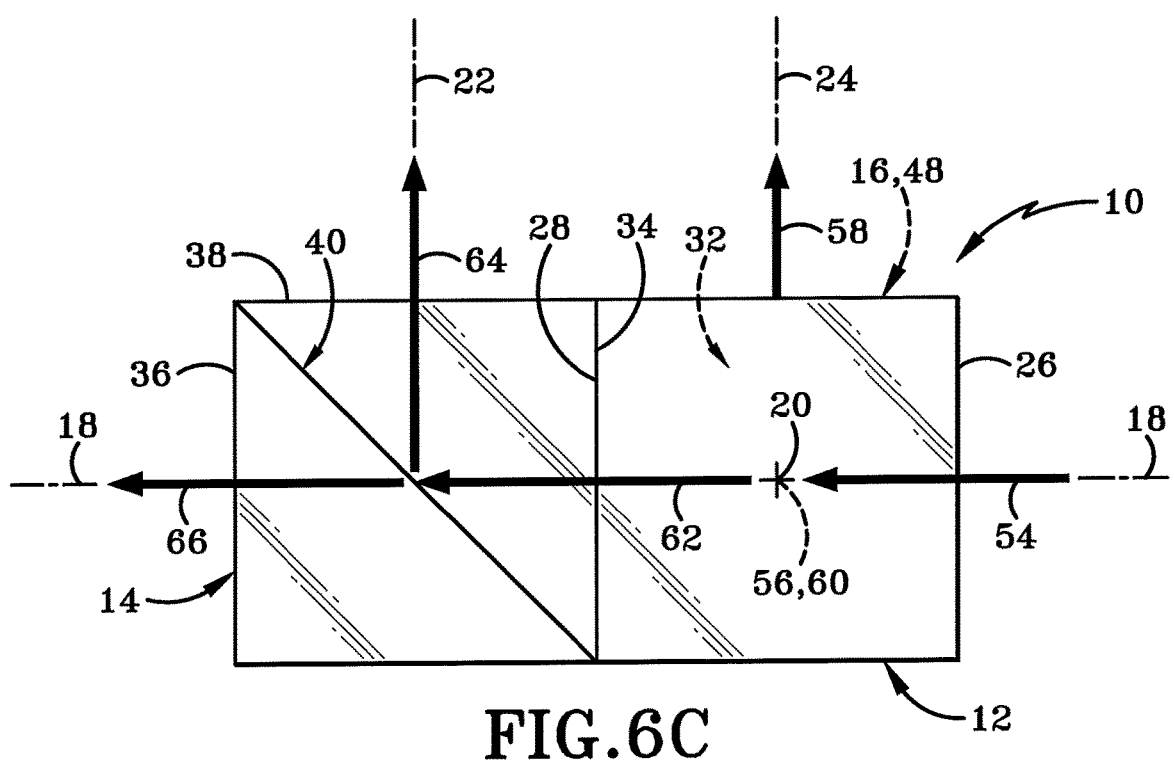
FIG. 6C is an operational side elevation view of the optical assembly taken along line 6C-6C in FIG. 6A.

In operation with reference to FIG. 6A-FIG. 6C, broadband light 54 enters the optical assembly 10 through the first surface 22 of the first PBS 12. Broadband light 54 entering along the optical axis 18 through the first surface 22 of the first PBS 12 will encounter the splitting surface 32. The polarizing splitting optical coating or splitting surface 32 will reflect light that is in the short-wavelength waveband. The reflection of the light in the short-wavelength waveband will direct this light along the transverse axis 20 (to the right in FIG. 6A) towards the third surface 30 of the first PBS. The splitting surface 32 will split light in the central wavelength waveband according to its polarization state relative to the splitter surface orientation: S-polarized or P-Polarized. S-polarized light will be directed along the transverse axis 20 out the third surface of the first PBS similar to the light in the short-wavelength waveband. Collectively, the light in the short-wavelength waveband and the S-polarized in the central wavelength waveband are shown generally at 56. FIG. 6C depicts the short-wavelength waveband light and S-polarized light in the central wavelength waveband at 56 using conventional vector notation depicting an X representing that this light 56 is being directed into the page. FIG. 6B indicates that the light 56 exits the third surface 30 in the first PBS 12 and enters through the seventh surface 42 on the third PBS 16. Light 56 interacts with splitting optical coating or splitting surface 48 in the third PBS 16. At the splitting surface 48 and the third PBS, the short-wavelength waveband light is split and directed upwardly along the second vertical axis 24 as indicated by arrow 58. The S-Polarized light reflected from the first beamsplitter will pass through the second beamsplitter as P-polarized light relative to the second beamsplitter due to the rotation of the second beamsplitter's splitting surface.

Referring back to FIG. 6A, at the first splitting optical coating or splitting surface 32 in the first PBS, the broadband light 54 engaging the splitting surface 32 that is in the long-wavelength waveband and is P-polarized in the central wavelength waveband passes through the splitting surface 32 at 62. The P-polarized light in the central wavelength waveband and the unpolarized light in the long-wavelength waveband, which are collectively shown at 62, are directed out of the second surface 24 of the first PBS and into the fourth surface 34 of the second PBS 14. As indicated in FIG. 6C, at the second splitting optical coating or splitting surface 40 in the second PBS 14, the light 62 is split and the P-polarized light in the central wavelength waveband is directed vertically along the first vertical axis 22 as indicated by arrow 64. Splitting surface 40 enables the light in the long-wavelength waveband to remain unpolarized and to pass through the splitting surface 40 along the optical axis 18 and exit the fifth surface 36 of the second PBS 14 as unpolarized light 66 in the long-wavelength waveband.

Figure 7A:
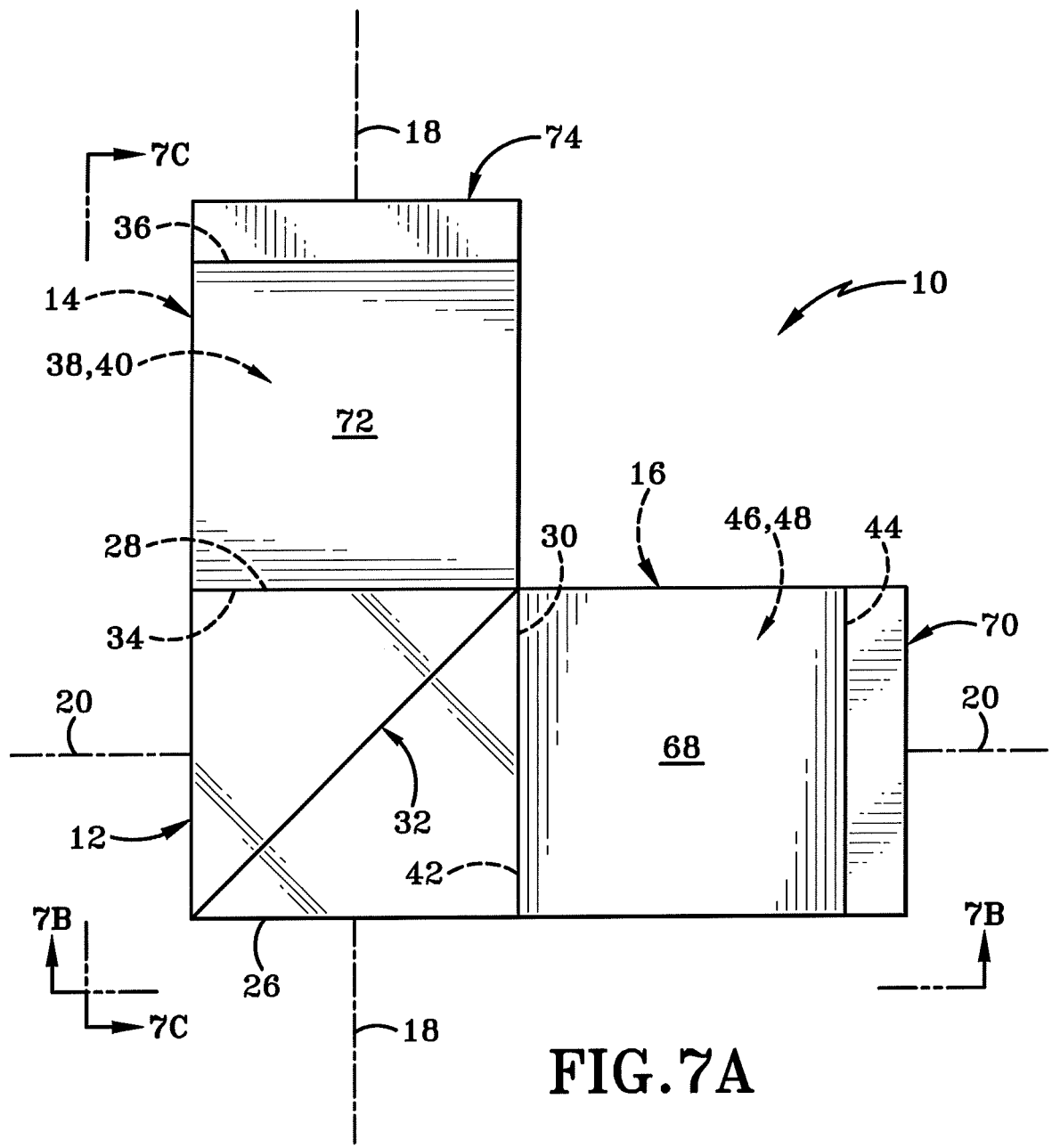
FIG. 7A is a top view of the optical assembly coupled with a plurality of image sensors.
Figure 7B:
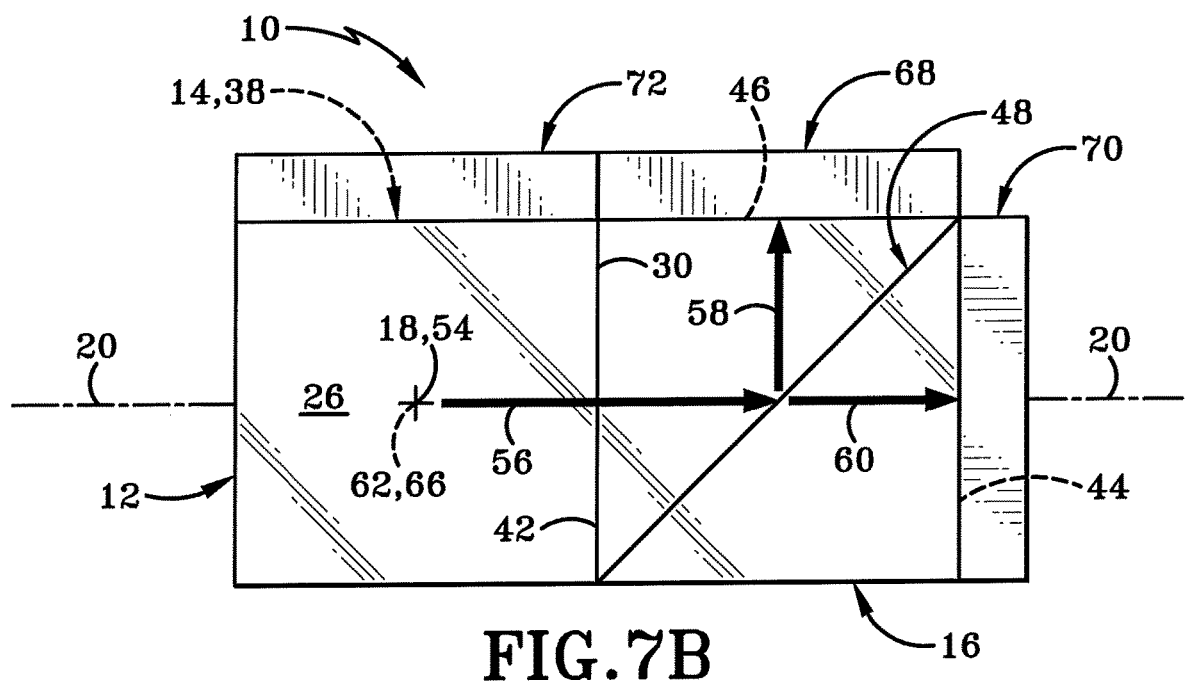
FIG. 7B is a front elevation view of the optical assembly with the image sensors taken along line 7B-7b in FIG. 7A.
Figure 7C:
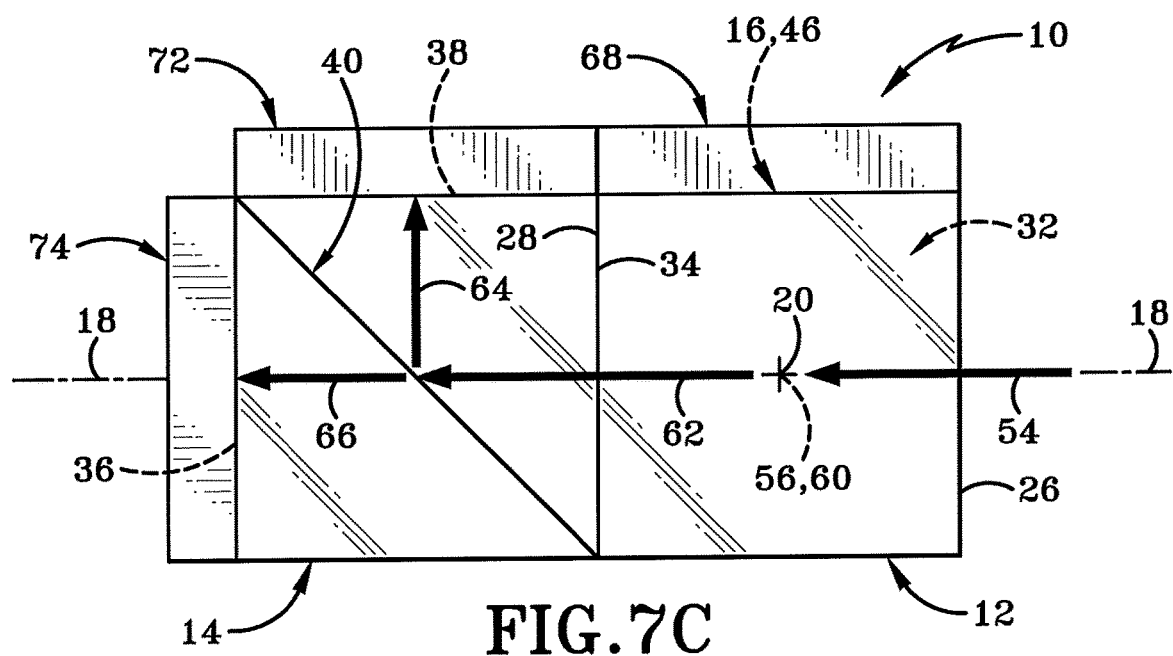
FIG. 7C is a side elevation view of the optical assembly and the image sensors taken along line 7C-7C in FIG. 7A.
Figure 8:
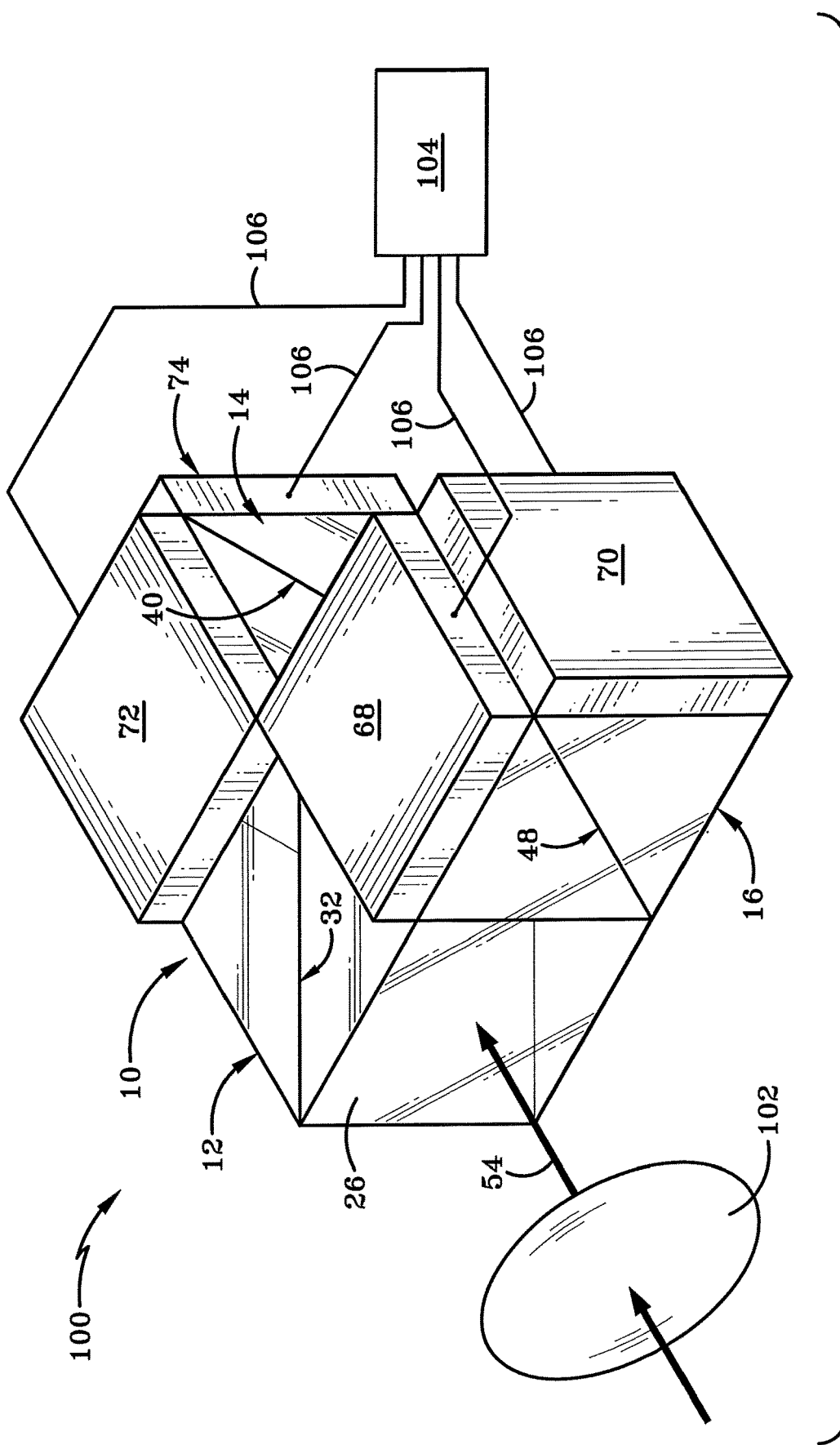
FIG. 8 is a diagrammatic view of a beamsplitting assembly utilizing the optical assembly in conjunction with a lens and imaging logic.

FIG. 7A-FIG. 7C depict the optical assembly 10 as having four image sensors connected thereto to capture and detect the respective light moving through the optical assembly 10. More particularly, one image sensor 68 is coupled with the ninth surface 46 of the third PBS 16 to image light 58. Another image sensor 70 is coupled with the eighth surface 44 to capture light 60. Another image sensor 72 is coupled with the sixth surface 38 on the second PBS 14 to capture light 64. Another image sensor 74 is coupled with the fifth surface 36 to capture light 66. The respective image sensors may be tuned to detect an image's light in the desired wavebands to ensure accurate detection of signals from the light focused into the optical assembly. For example, image sensor 68 may be an image sensor that is configured to detect light in the short-wavelength waveband. Image sensor 70 may be an image sensor configured to detect light in the central wavelength waveband. Image sensor 72 may be an image sensor configured to detect light in the central wavelength waveband. Image sensor 74 may be an image sensor configured to detect light in the long-wavelength waveband. Thus, the optical assembly of the present disclosure, coupled with four image sensors, enables the optical assembly 10 and the image sensors to collectively obtain and image for data streams from the broadband light 54 input into the optical assembly 10. Image sensors or detector which converts incident optical signal into an electrical signal which can be processed further by electrical logic FIG. 8 diagrammatically depicts a beamsplitting assembly 100 that includes the optical assembly 10 having the four image sensors 68, 70, 72 and 74 connected thereto. Beamsplitting assembly 100 additionally includes an imaging object 102, such as a lens, mirror, or other optics, that is optically upstream from the optical assembly 10 configured to focus or redirect the broadband light 54 onto the first surface 26 of the first PBS 12. Notably, redirecting the light 54 is possible as this design also works for collimated or afocal light, as long as the input angles are within the design range of the coatings. Beamsplitting assembly 100 may additionally include imaging logic 104 coupled with the image sensors 68, 70, 72 and 74 via links 106, which may be wired or wireless to centrally process the data streams or images obtained by the respective image sensors.

Figure 10:
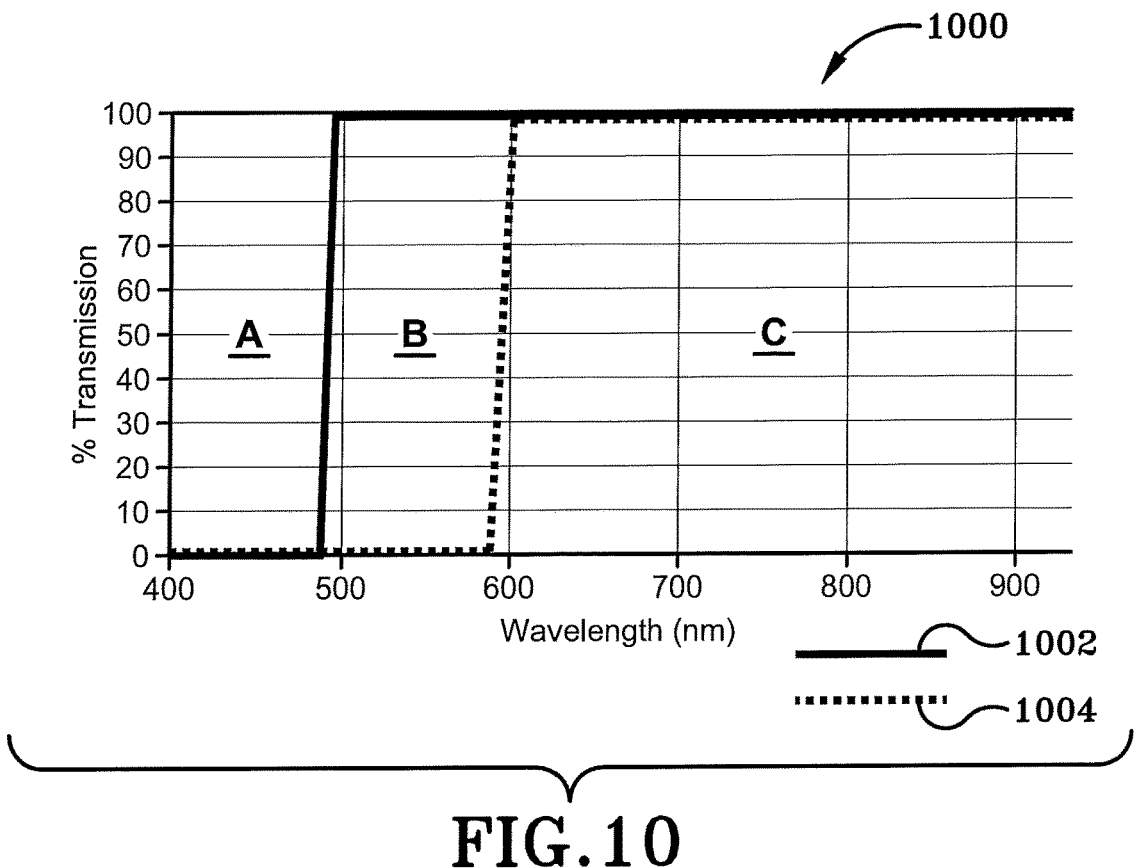
FIG. 10 is an exemplary graph of transmission efficiency vs wavelength for an exemplary polarizing beam splitter having three regions.

FIG. 10 depicts an exemplary transmission curve 1000 of an exemplary PBS. The graph of FIG. 10 delineates a region of band A (i.e., a short-wavelength waveband), a region of band B (i.e., a central wavelength waveband), and a region of band C (i.e., a long-wavelength waveband). Region A and Region B are delineated by the S-pol 1002 transmission curve. Region B and Region C are delineated by the P-pol 1004 transmission curve. Region B is between the S-Pol transmission curve 1102 and the P-pol transmission curve 1104. Region A shows that most of the shorter wavelength light is not being transmitted, it is being reflected. Region B shows that the splitting surface or splitting optical coating is reflecting or transmitting based on input polarization. This is how the PBS is intended to be used over that range. Region C shows that most of the longer wavelength light is being transmitted regardless of polarization.

In FIG. 10, by way of non-limiting example, the regions may be established as a blue waveband associated with region A that is any wavelength below about 450 nanometers, the region B associated with green light is from about 450 nanometers to about 700 nanometers. The third region or region C associated with the red light is typically any waveband greater than about 700 nanometers. In this instance, the polarizing range would be associated with region B and may generally be any waveband between 450 nanometers and about 700 nanometers.

Figure 11:
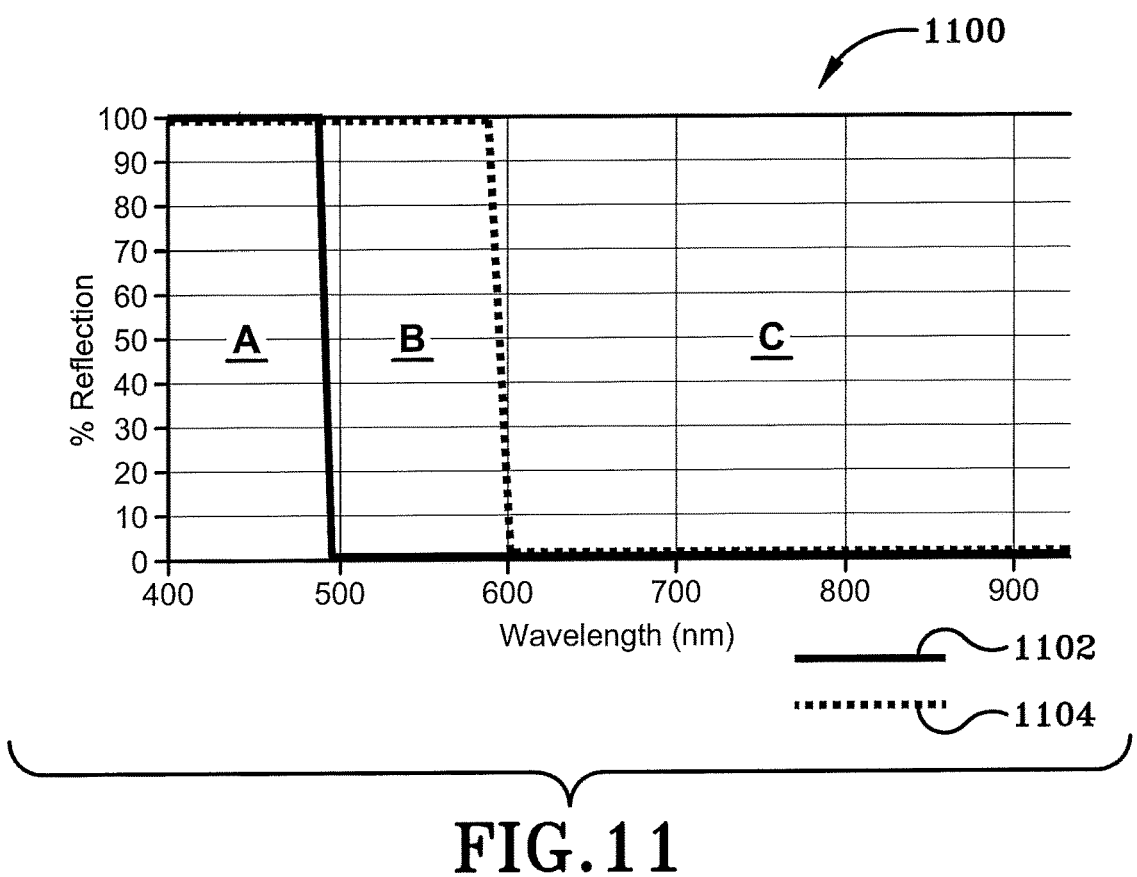
FIG. 11 is another exemplary graph of reflection efficiency vs wavelength for an exemplary polarizing beam splitter having three regions.

FIG. 11 depicts an exemplary transmission curve 1100 of an exemplary PBS. The graph of FIG. 11 delineates a region of band A (i.e., a short-wavelength waveband), a region of band B (i.e., a central wavelength waveband), and a region of band C (i.e., an long-wavelength waveband). Region A and Region B are delineated by the S-pol 1102 transmission curve. Region B and Region C are delineated by the P-pol 1104 transmission curve. Region B is between the S-Pol transmission curve 1102 and the P-pol transmission curve 1104. Region A shows that most of the shorter wavelength light is not being transmitted, it is being reflected. Region B shows that the splitting surface or splitting optical coating is reflecting or transmitting based on input polarization. This is how the PBS is typically intended to be used over its original design range, region B. Region C shows that most of the longer wavelength light is being transmitted regardless of polarization.

Region A corresponds to shorter wavelengths. As indicated by the graph, transmission percentages low for wavelengths between 300 and 500 nanometers. In one example, the transmission is less than about 10% for wavelengths below 500 nanometers. The region associated with waveband B is where the PBS is splitting the light into different polarization. Thus, from 500 nm to 600 nm, the PBS is providing an evenly split beam polarization. In region C, all of the light is passed through the PBS. Thus, the PBS looks and functions like a mirror for region A, it looks and functions as a beamsplitter for the light within region B, and it looks and functions as a window for the light in region C. Another aspect is that region B, the output depends on the orientation of the PBS. Thus, by putting a second PBS behind first PBS and rotating it 90° about the first optical axis, the beams for cross polarization and co-polarization in region B are reflected out of the beamsplitter and may be obtained by an image sensor. The light from region C again passes completely through the second PBS, which is results in four outputs.

Referring to the back to Background, generally, when an additional optical band of interest is desired, there are a few different approaches that may be taken. One approach is to create an alternating pattern of filters on an image sensor, such as a Bayer pattern. Another approach is to use dichroic optical thin films and one or more beamsplitters to split the light into its different bands. This requires multiple centers, one on each face of the beamsplitter that is outputting light. Another approach is to have multiple optical receivers, such as telescopes or lenses, that each have a filter to block all signals but the band of interest. This requires multiple optical receivers and can be prohibitively expensive for complicated optical receivers. This also introduces parallax error to the data that may cause problems with fusing the data from the different sensors.

In accordance with one aspect of the present disclosure, in order to add the unpolarized waveband (i.e., light in the long-wavelength waveband), the present disclosure is able to do so without changing the beam splitting coating or pixelating the pattern on a sensor. Thus, since a separate image sensor or camera is required, the use of a configuration of beamsplitters in accordance with the present disclosure is advantageous.

The imaging system 100 of the present disclosure is placed behind or downstream relative to the optical axis of a lens 102 or a telescope or other imaging objective. Stated otherwise, the lens 102 has an input side and an output side and the optical axis 18 extends through the lens 18 from the input side to the output side. The optical assembly 10 is optically subsequent to the output side of the lens 102. Thus, the lens 102 focuses light from a source onto a first component of the optical assembly 10 of the present disclosure. The source may be any form of light that has many different wavelengths and polarizations. Thus, the lens 102 focuses the broadband light onto a first component of optical assembly 10 of the present disclosure.

In one exemplary aspect, the first component of the image sensor of the present disclosure is first PBS 12. In one exemplary embodiment, the first PBS 12 may be specifically manufactured to tune the optical requirements of a desired application. However, it is entirely possible to construct optical assembly 10 of the present disclosure by using commercial off the shelf (COTS) polarizing beamsplitters.

The second PBS 14 is fabricated identically to the first PBS 12. As described in greater detail herein, by fabricating the PBSs identically, the system 100 or assembly 10 may greatly reduce cost by having a uniformity of production. This is an advantage over previous systems which require different coatings for different beamsplitters. The second PBS 14 is rotated 90° relative to the initial optical input axis.

Notably, the 90° rotation is distinguished from a conventional 0° rotation or a 180° rotation that is ordinarily utilized.

In operation, the broadband light 54 is input at the first PBS. The first splitting surface or splitting optical coating 32 reflects the S-polarized light of waveband region B (which may be green light) and all of the light from waveband region A. The remaining light from waveband region C passes through the first PBS and through the splitting optical coating 32 with low loss in transmission (e.g., as if it were a window). The light beam moving through the first coating 32 and into the second PBS 14 contacts the second splitting optical coating or splitting surface 40 in the second PBS 14. The remaining P-polarized green light or P-polarized light of waveband region B is reflected in a direction that is 90° offset from the P-polarized light from the first PBS 12. Generally, in this exemplary embodiment, the 90° offset may be considered a vertical direction. Thus, when the P-polarized light is output along a transverse axis orthogonal to the original input axis, the second P-polarized light is output along a vertical axis which is orthogonal to the original input axis and orthogonal to the transverse axis associated with the first PBS 12. Then, the remainder of waveband region C light is passed through the second PBS 14.

The first PBS 12 and second PBS 14 operate as crossed polarizers; however, in this assembly, the light from the second PBS 14, rather than being blocked, is redirected to an image sensor 72. Then, nearly 100% of the light in the waveband B is reflected. Since the beamsplitter is tuned to efficiently split the polarization of the green light, the second PBS passes the red light in region C moving through the second PBS 14 while introducing minimal attenuation, reflection, or polarization effects.

Prior to the embodiments of present disclosure, previous prism assembly and beamsplitters utilized a filter after a polarizing beamsplitter to only pass the light of interest. Thus, all of the light that is not of interest was filtered out and thus wasted. The present disclosure may utilize filters on the green channel associated with waveband region B. There may also be an additional red filter subsequent to the second PBS to narrow the desired red band of interest. Thus, the red filtered light in waveband region C, rather than being blocked, would be redirected to another image sensor (i.e., sensor 74). The image sensor 74 may be placed at the focus of the light output from the second PBS 14. Thus, there may not be a need for fiber optics or other transmission lines to transmit the output red light from the second PBS to the image sensor. However, it of course, is entirely possible to utilize the secondary component to transfer the light from the second PBS to the image sensor.

Previously, signals in the longer-wavelength waveband were not recorded due to the increased cost and difficulties of doing so inasmuch as the longer wavelengths were outside the sensitivity range of the image sensor being used. Previous image sensors provide limited sensitivity over this additional waveband and come with the added limitation of losing spatial resolution by bayer patterning a filter array on the focal plane, or by relying on custom dichroic coatings to split the additional waveband to a camera with a focal plane material better tuned to the additional waveband. Previously, there was no sensor that was able to view both the green bands and the red bands due to non-overlapping sensitivities.

In accordance with one exemplary aspect of the present disclosure, the polarizing nature of the PBSs oriented in this manner, the optical assembly 10 of the present disclosure uses a common polarizing coating in this configuration to achieve that previously required much more complicated configurations. As indicated herein, typically, all PBSs have the first region (region A), a second region (region B) and a third region (region C). Many PBSs naturally reflect the blue light (region A), polarize the green light (region B) and pass the red light (region C). PBSs bonded in this manner are advantageous to obtain a multispectral polarizing beamsplitter assembly with a single coating run for the manufacture of the PBSs. This is advantageous because previous systems required custom coatings, such as a custom coating that would reflect red light, a custom coating that would reflect green light, and a custom coating that would reflect blue light. Each one of these custom coatings would typically require individual non-recurring engineering costs for the custom design and development, as well as its own dedicated coating run. The development of three custom coatings would therefore take more time, resources, and complexity to achieve the same result with one PBS coating design and coating run. By only performing a single manufacturing run with one coating, the present disclosure is able to accomplish a significant advantage of achieving a polarizing beamsplitting assembly through the use of only a single common coating manufacturing run. The splitting surface or coating is a thin film coating that operates as an interference filter that is tuned to pass a certain wavelength, split a certain wavelength, and reflect a certain wavelength. In one embodiment, the coating may be a dielectric coating that is optimized for this particular application.

Figure 9:
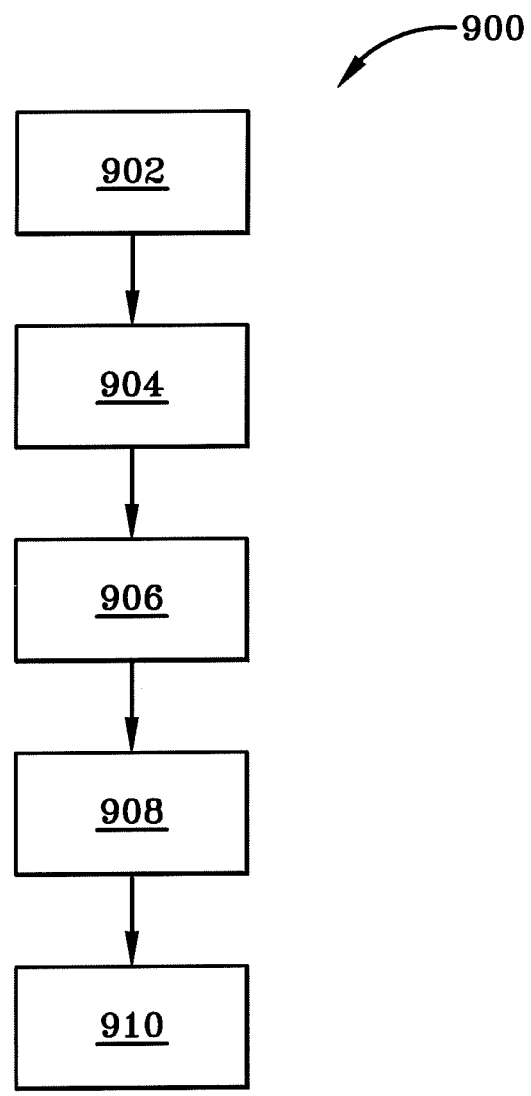
FIG. 9 is a flow chart depicting an exemplary method in accordance with one aspect of the present disclosure.

The imaging system of the present disclosure provides some additional exemplary cost saving advantages over previous image systems. For example, assuming that the broadband light is desired to be split into four channel components, namely a short band, a long band, a cross polarization mid-band and a co-polarization mid-band. To do so, the light must be split three times in order to get the four channels. Typically, if light is to be split three times for different target outputs, then there would need to be three different coatings to obtain the desired four outputs. Three different coatings would be specifically tuned to cut off part of the spectrum. Thus, three different coatings requires three separate coating runs in a coating chamber and coating designs. The three different designs with three different production runs significantly increased time and product cost. Additionally, there is a significant amount of wasted coating material due to the three production runs that are required. Additionally, there is empty space in the manufacturing process because there would be less prism coatings per run in the prism coating chamber. The present disclosure cures this by utilizing a common polarizing coating configuration that is the same for each PBS. By using a common PBS having a similar design as all the other PBSs in the system, it is able to reduce cost by producing the PBS components in a single coating manufacturing run. Effectively, the present disclosure enables the light to be split into four different bands using a single coating design on different PBSs rather than relying on different coatings on different PBSs. In order to extend this design procedure to additional spectral and polarization bands, the broadband input for one of these three-PBS assemblies can be the output from another PBS or PBS assembly. One could conceivably use any number of PBS coating designs to separate additional bands. For example, one could use a new coating design for a second PBS and a third PBS whose central design wavelengths are tuned to match the unpolarized outputs from the first PBS. With three PBS coating designs 8 output bands can be achieved. The number of total bands by using this approach recursively generally follows B=2+2N, where B is the number of output wavebands and N is the number of PBS coating designs used FIG. 9 is a flowchart depicting an exemplary operational method 900 of the optical assembly 10 and the beamsplitting assembly 100. Method 900 includes inputting broadband light into the first PBS 12 including the first splitting optical coating 32, wherein the broadband light 54 includes wavebands in a short-wavelength waveband, a central wavelength waveband, and an long-wavelength waveband, which is shown generally at 902. Method 900 includes reflecting wavebands in the short-wavelength waveband at the first splitting optical coating 32, which is shown generally at 904. Method 900 includes polarizing and splitting wavebands in the central wavelength waveband at the first splitting optical coating 32, which is shown generally at 906. Method 900 includes passing wavebands in the long-wavelength waveband through the first splitting optical coating 32, which is shown generally at 908. Method 900 includes transmitting wavebands in the long-wavelength waveband and polarized wavebands in the central wavelength waveband to the second PBS 14 having the second optical 40 coating that is identical to the first splitting optical coating 32, and the second splitting optical coating 40 is oriented as rotated 90° relative the first splitting optical coating 32, which is shown generally at 910. Method 900 includes passing wavebands in the long-wavelength waveband through the second splitting optical coating 40, which is shown generally at 912. Method 900 includes reflecting wavebands in the central wavelength waveband at the second splitting optical coating 40, which is shown generally at 914. Method 900 includes imaging wavebands in the long-wavelength waveband with image sensor 74 coupled to the second PBS and tuned to the long-wavelength waveband, which is shown generally at 916. Method 900 includes imaging wavebands in the central wavelength waveband with another image sensor 72 coupled to the second PBS and tuned to the central wavelength waveband, which is shown generally at 918.

Method 900 may additionally include transmitting wavebands in the short-wavelength waveband and polarized wavebands in the central wavelength waveband to a third PBS having a third splitting optical coating that is identical to the first splitting optical coating and the second splitting optical coating, and the third splitting optical coating is oriented as rotated 90° relative to the first splitting optical coating. Method 900 may further includes passing wavebands in the central wavelength waveband through the third splitting optical coating. Method 900 may further includes reflecting wavebands in the short-wavelength waveband at the third splitting optical coating. Method 900 may further includes imaging waveband in the central wavelength waveband with another image sensor coupled to the third PBS and tuned to the central wavelength waveband. Method 900 may further include imaging waveband in the short-wavelength waveband with another image sensor coupled to the third PBS and tuned to the short-wavelength waveband.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments of the imaging system 100 and the optical assembly 10 described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, a computer or smartphone may be utilized to execute the software code or instructions via its processors may have one or more input and output devices for imaging logic 104 of imaging system 100. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Imaging Logic", or imaging logic 104, as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The term waveband refers to a range of wavelengths, so a waveband can be considered a wavelength region. Shorter, central, and longer refer to the wavelengths of each waveband relative to the central one. The central waveband is the original range of wavelengths that the PBS was designed to split polarization over.

The term S-Polarized or Transverse-Electric light refers to light of linear polarization where the electric field oscillates along the plane of the surface that it will interact with. P-polarized or Transverse-Magnetic light also refers to a state of linear polarized light, except the plane of magnetic field oscillates along the surface it will interact with. With P-polarized or Transverse-Magnetic light, the electric field portion of the incident light oscillates towards and away the surface.

With respect to the splitting surfaces or optical coatings within each PBS that split the wavebands may be formed from conventional splitting materials. In some instances the splitting surface is an internal surface. In other instances, the coating is a coating layer applied to a ½ cube (i.e., a right angle prism along its hypotenuse face) during the manufacture of the cube prior to merging the ½ cube with a second ½ cube. In these instances, the coating would be a thin layer of dissimilar material from the material forming the cube. The coating material of the splitting surface may be formed from a dielectric material. The coating will reflect and transmit the unpolarized, monochromatic and incident beam into its S and P polarization components. In general, cube beamsplitters allow the optical system to have a superior resolution by eliminating asymmetrical optical aberrations. Cube beamsplitters are beneficial for different applications that require simplified mounting or system integration and durability. It is mostly used in photonics instrumentation or semiconductor in transmitting P-polarized light while reflecting S-polarized light. These are available in different wavelength ranges and common laser wavelengths. The typical design is between 0° and 45° angle of incidence with separation of the beams at 90°. Any split between transmission and reflection can be designed depending on the configuration.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An optical assembly comprising:
a first polarizing beamsplitter (PBS) having a first splitting optical coating;
a second PBS having a second splitting optical coating that is substantially identical to the first splitting optical coating;
wherein the second splitting optical coating is oriented as rotated 90° about transmitted and reflected optical axes of the first splitting optical coating;
a third PBS having a third splitting optical coating that is substantially identical to the first splitting optical coating and the second splitting optical coating;
wherein the third splitting optical coating is oriented as rotated 90° relative to the first splitting optical coating;
wherein the first splitting optical coating, the second splitting optical coating, and the third splitting optical coating are substantially identical;
four image sensors including a first image sensor coupled to the second PBS to image polarized wavebands in a central wavelength waveband, a second image sensor coupled to the second PBS to image unpolarized wavebands in a long-wavelength waveband, a third image sensor coupled to the third PBS to image the polarized wavebands in the central wavelength waveband, and a fourth image sensor coupled the third PBS to image unpolarized light the wavebands in a short-wavelength waveband;
imaging logic coupled to each of the four image sensors that output results of the detected light in each of the three wavebands; and
wherein the central wavelength waveband includes wavelengths in a range greater than the short-wavelength waveband and less than the long-wavelength waveband, wherein the long-wavelength waveband includes wavelengths in a range greater than the central wavelength waveband and the short-wavelength waveband, wherein the short-wavelength waveband includes wavelengths in a range less than the central wavelength waveband.

2. An optical assembly comprising:
a first polarizing beamsplitter (PBS) having an optical axis and a transverse axis that is orthogonal to the optical axis;
a splitting optical coating on the first PBS that splits light into one of three wavebands, wherein the three wavebands include a short-wavelength waveband, a central wavelength waveband, and a long-wavelength waveband, wherein unpolarized light input into the first PBS that is in the short-wavelength waveband is reflected, and light input into the first PBS that is in the central-wavelength waveband is polarized and split such that S-polarized wavebands are reflected and P-polarized wavebands pass through the splitting optical coating on the first PBS, and unpolarized light input into the first PBS that is in the long-wavelength waveband passes through the splitting optical coating on the first PBS;
a second PBS aligned along the optical axis having a first vertical axis that perpendicularly intersects the optical axis and is orthogonal to the transverse axis in the first PBS;
a splitting optical coating on the second PBS, wherein light output from the first PBS and input into the second PBS that is in the central wavelength waveband is polarized and reflected such that P-polarized wavebands output from the first PBS are reflected by the rotated second PBS, and light output from the first PBS and input into the second PBS that is in the long-wavelength waveband passes through the splitting optical coating of the second PBS;
a third PBS aligned along the transverse axis including a second vertical axis parallel to the first vertical axis, orthogonal to the optical axis, and the second vertical axis perpendicularly intersects the transverse axis in the first PBS;
a splitting optical coating on the third PBS, wherein the S-polarized wavebands of the central wavelength waveband and unpolarized light in the short-wavelength waveband reflected from the first PBS is input into the third PBS and the splitting optical coating on the third PBS reflects light in the short-wavelength waveband along the second vertical axis, and the S-polarized wavebands in the central-wavelength waveband move through the splitting optical coating along the transverse axis and are polarized into P-polarized wavebands along the transverse axis;
an interfacing union between major surfaces on the first PBS and the second PBS;
an interfacing union between major surfaces on the first PBS and the third PBS;
wherein the central wavelength waveband includes wavelengths in a range greater than the short-wavelength waveband and less than the long-wavelength waveband, wherein the long-wavelength waveband includes wavelengths in a range greater than the central wavelength waveband and the short-wavelength waveband, wherein the short-wavelength waveband includes wavelengths in a range less than the central wavelength waveband;
wherein the second PBS is oriented as rotated 90° about the optical axis relative to the first PBS; and
wherein the splitting optical coating on the first PBS is substantially identical to the splitting optical coating on the second PBS.

3. The optical assembly of claim 2, wherein the splitting optical coating on the first PBS and the splitting optical coating on the second PBS includes:

a coating material inside each PBS, formed between two ½ cube portions of the PBS joined together, the coating material being substantially identical.

4. The optical assembly of claim 2, wherein the first PBS includes:
   a first surface and a second surface wherein the second surface is parallel to the first surface; and
   a third surface orthogonal to the first surface and the second surface;
   wherein the splitting optical coating on the first PBS extends diagonally from the first surface to the second surface.

5. The optical assembly of claim 4, further comprising:
   wherein the splitting optical coating in the first PBS reflects light in the short-wavelength waveband out the third surface and some light in the central wavelength waveband is reflected towards the third surface;
   wherein light in the long-wavelength waveband is passed through the splitting optical coating in the first PBS towards the second surface along the optical axis and a portion of light in the central wavelength waveband light is polarized as it passes through the splitting optical coating in the first PBS towards the second surface along the optical axis.

6. The optical assembly of claim 2, further comprising:
   a substantially identical formulation of the splitting optical coating on the third PBS as the splitting optical coating on the first PBS and the second PBS.

7. The optical assembly of claim 2, further comprising:
   a 90° offset orientation of the interfacing union between the first PBS and the second PBS relative to the interfacing union between the first PBS and the third PBS.

8. The optical assembly of claim 7, wherein each PBS is substantially identical and formed as a cube.

9. A beamsplitting assembly comprising:
   a first polarizing beam splitter (PBS) having an optical axis extending from a first surface to a second surface wherein the second surface is parallel to the first surface, and the first PBS includes a third surface orthogonal to the first surface and the second surface of the first PBS, wherein a transverse axis extends through the third surface and the transverse axis is orthogonal to the optical axis;
   a splitting optical coating on the first PBS extending diagonally from the first surface to the second surface that splits and polarizes light into one of three wavebands, wherein the three wavebands include a short-wavelength waveband, a central wavelength waveband, and a long-wavelength waveband, wherein unpolarized light input into the first PBS that is in the short-wavelength waveband is reflected by the splitting optical coating out the third surface, and light input into the first PBS that is in the central wavelength waveband is polarized and split such that S-polarized wavebands are reflected towards the third surface and P-polarized wavebands pass through the splitting optical coating towards the second surface along the optical axis, and light input into the first PBS that is in the long-wavelength waveband passes through the splitting optical coating towards the second surface;
   wherein the central wavelength waveband includes wavelengths in a range greater than the short-wavelength waveband and less than the long-wavelength waveband, wherein the long-wavelength waveband includes wavelengths in a range greater than the central wavelength waveband and the short-wavelength waveband,
   wherein the short-wavelength waveband includes wavelengths in a range less than the central wavelength waveband;
   a second PBS aligned along the optical axis from a fourth surface to a fifth surface, wherein the fifth surface is parallel to the fourth surface, and the fourth surface is parallel and directly interfaced with the second surface of the first PBS, and the second PBS includes a sixth surface orthogonal to the fourth surface and the fifth surface of the second PBS, wherein a first vertical axis extends through the sixth surface and the vertical axis is orthogonal to the optical axis and the transverse axis in the first PBS;
   a splitting optical coating on the second PBS extending diagonally from the fourth surface to the fifth surface that splits and polarizes light wherein light output from the first PBS and input into the second PBS that is in the central wavelength waveband is polarized and reflected such that P-polarized light in the central wavelength waveband relative to the first PBS reflects as S-polarized light relative to the second PBS are reflected towards the sixth surface, and light output from the first PBS and input into the second PBS that is in the long-wavelength waveband passes through the splitting optical coating of the second PBS towards the fifth surface and remains unpolarized;
   wherein the second PBS is oriented relative to the first PBS as rotated 90° about the optical axis;
   a third PBS aligned along the transverse axis of the first PBS from a seventh surface to an eighth surface, wherein the eighth surface is parallel to the seventh surface, and the seventh surface is parallel and directly interfaced with the third surface of the first PBS, and the third PBS includes a ninth surface orthogonal to the seventh surface and the eighth surface of the third PBS, wherein a second vertical axis extends through the ninth surface and the second vertical axis parallel to the first vertical axis, orthogonal to the optical axis, and orthogonal the transverse axis in the first PBS;
   a splitting optical coating on the third PBS extending diagonally from the seventh surface to the eighth surface that splits and polarizes light, wherein the S-polarized central wavelength wavebands and light in the short-wavelength waveband output from the first PBS through the third surface is input into the third PBS through the seventh surface and the splitting optical coating on the third PBS reflects light in the short-wavelength waveband along the second vertical axis through the ninth surface, and the S-polarized central wavelength wavebands that move through the splitting optical coating along the transverse axis is polarized into P-polarized central wavelength wavebands and pass through the eighth surface along the transverse axis;
   wherein the splitting optical coating on the first PBS is substantially identical to the splitting optical coating on the second PBS and is substantially identical to the splitting optical coating on the third PBS, wherein the splitting optical coating on the first PBS, the splitting optical coating on the second PBS, and the splitting optical coating on the third PBS are produced during one manufacturing run that is adapted to ensure the splitting optical coatings are substantially identical;
   four image sensors including one image sensor coupled to the sixth surface of the second PBS to image the polarized wavebands in the central wavelength waveband, one image sensor coupled to the fifth surface of the second PBS to image unpolarized wavebands in the long-wavelength waveband, one image sensor coupled to the eighth surface of the third PBS to image the polarized wavebands in the central wavelength waveband, and one image sensor coupled to the ninth surface of the third PBS to image the wavebands in the short-wavelength waveband; wherein the image sensor coupled to the fifth surface of the second PBS is an infrared (IR) image sensor; and imaging logic coupled to each of the four image sensors that output results of the detected light in each of the three wavebands.

\* \* \* \* \*